United States Patent [19]

Gerber et al.

[11] Patent Number: 4,872,078

[45] Date of Patent: Oct. 3, 1989

[54] METHOD AND APPARATUS FOR ENCODING AND DIRECT OVERWRITING OF MAGNETO-OPTIC DATA

[75] Inventors: Ulrich G. Gerber, Fremont; Daniel Rugar, Palo Alto, both of Calif.

[73] Assignee: International Business Machines Corporation, Armonk, N.Y.

[21] Appl. No.: 130,813

[22] Filed: Dec. 9, 1987

Related U.S. Application Data

[63] Continuation-in-part of Ser. No. 855,542, Apr. 24, 1986, abandoned.

[51] Int. Cl.$^4$ .......................... G11B 5/127; G11B 5/02
[52] U.S. Cl. ........................................ 360/114; 360/59
[58] Field of Search ...................... 369/13, 59, 100; 360/59, 114

[56] References Cited

U.S. PATENT DOCUMENTS

| | | | |
|---|---|---|---|
| 3,676,867 | 7/1972 | Bacon et al. | 340/174 |
| 3,778,791 | 12/1973 | Lewicki et al. | 340/174.1 |
| 3,786,452 | 1/1974 | Geusic | 340/174 |
| 3,787,825 | 1/1974 | DeJonge | 340/174 |
| 3,836,895 | 9/1974 | DeJonge | 340/174 |
| 3,836,897 | 9/1974 | Marsh | 340/174 |
| 4,340,914 | 7/1982 | Hanaoka | 360/59 |
| 4,472,748 | 12/1981 | Kato et al. | 360/59 |
| 4,495,530 | 1/1985 | Yanagida | 360/59 |

*Primary Examiner*—Vincent P. Canney
*Attorney, Agent, or Firm*—Henry E. Otto, Jr.

[57] ABSTRACT

Direct overwrite of data on magneto-optic medium is described. Old data is erased and new data is written during a single rotation of the media in a data storage system which includes a resonant coil for producing a high frequency alternating magnetic field interacting with laser pulses having a duration equal to a small fraction of the period of the magnetic field. Variable-length magnetic domains are formed by overlapping circular magnetic domains to provide pulse width modulation (PWM) encoding of data.

22 Claims, 7 Drawing Sheets

EXAMPLE OF (2,8) CODE WITH EVEN
NUMBER OF CONSECUTIVE ZEROES

FIG. 5

| INPUT DATA | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ |
|---|---|---|---|---|---|---|---|---|---|---|---|---|---|---|---|
| 0 0 0 0 | 0 | 0 | 0 | 0 | 1 | 0 | 0 | 0 | 0 | 1 | 0 | 0 | 1 | 0 | 0 |
| 0 0 0 1 | 0 | 0 | 0 | 0 | 1 | 0 | 0 | 1 | 0 | 0 | 0 | 0 | 1 | 0 | 0 |
| 0 0 1 0 | 0 | 0 | 0 | 0 | 1 | 0 | 0 | 1 | 0 | 0 | 1 | 0 | 0 | 0 | 0 |
| 0 0 1 1 | 0 | 0 | 1 | 0 | 0 | 0 | 0 | 0 | 0 | 1 | 0 | 0 | 1 | 0 | 0 |
| 0 1 0 0 | 0 | 0 | 1 | 0 | 0 | 0 | 0 | 1 | 0 | 0 | 0 | 0 | 1 | 0 | 0 |
| 0 1 0 1 | 0 | 0 | 1 | 0 | 0 | 0 | 0 | 1 | 0 | 0 | 1 | 0 | 0 | 0 | 0 |
| 0 1 1 0 | 0 | 0 | 1 | 0 | 0 | 1 | 0 | 0 | 0 | 0 | 0 | 0 | 1 | 0 | 0 |
| 0 1 1 1 | 0 | 0 | 1 | 0 | 0 | 1 | 0 | 0 | 0 | 0 | 1 | 0 | 0 | 0 | 0 |
| 1 0 0 0 | 1 | 0 | 0 | 0 | 0 | 0 | 0 | 0 | 0 | 1 | 0 | 0 | 1 | 0 | 0 |
| 1 0 0 1 | 1 | 0 | 0 | 0 | 0 | 0 | 0 | 1 | 0 | 0 | 0 | 0 | 1 | 0 | 0 |
| 1 0 1 0 | 1 | 0 | 0 | 0 | 0 | 0 | 0 | 1 | 0 | 0 | 1 | 0 | 0 | 0 | 0 |
| 1 0 1 1 | 1 | 0 | 0 | 0 | 0 | 1 | 0 | 0 | 0 | 0 | 0 | 0 | 1 | 0 | 0 |
| 1 1 0 0 | 1 | 0 | 0 | 0 | 0 | 1 | 0 | 0 | 0 | 0 | 1 | 0 | 0 | 0 | 0 |
| 1 1 0 1 | 1 | 0 | 0 | 1 | 0 | 0 | 0 | 0 | 0 | 0 | 0 | 0 | 1 | 0 | 0 |
| 1 1 1 0 | 1 | 0 | 0 | 1 | 0 | 0 | 0 | 0 | 0 | 1 | 0 | 0 | 0 | 0 | 0 |
| 1 1 1 1 | 1 | 0 | 0 | 1 | 0 | 0 | 1 | 0 | 0 | 1 | 0 | 0 | 1 | 0 | 0 |

LASER PULSING SEQUENCE CORRESPONDING
TO THE CODE IN FIG. 5

FIG. 6

| INPUT DATA | $L_1$ | $L_2$ | $L_3$ | $L_4$ | $L_5$ | $L_6$ | $L_7$ | $L_8$ | $L_9$ | $L_{10}$ | $L_{11}$ | $L_{12}$ | $L_{13}$ | $L_{14}$ | $L_{15}$ |
|---|---|---|---|---|---|---|---|---|---|---|---|---|---|---|---|
| 0 0 0 0 | 0 | 1 | 0 | 1 | 1 | 0 | 1 | 0 | 1 | 1 | 0 | 1 | 1 | 0 | 1 |
| 0 0 0 1 | 0 | 1 | 0 | 1 | 1 | 0 | 1 | 1 | 0 | 1 | 0 | 1 | 1 | 0 | 1 |
| 0 0 1 0 | 0 | 1 | 0 | 1 | 1 | 0 | 1 | 1 | 0 | 1 | 1 | 0 | 1 | 0 | 1 |
| 0 0 1 1 | 0 | 1 | 1 | 0 | 1 | 0 | 1 | 0 | 1 | 1 | 0 | 1 | 1 | 0 | 1 |
| 0 1 0 0 | 0 | 1 | 1 | 0 | 1 | 0 | 1 | 1 | 0 | 1 | 0 | 1 | 1 | 0 | 1 |
| 0 1 0 1 | 0 | 1 | 1 | 0 | 1 | 0 | 1 | 1 | 0 | 1 | 1 | 0 | 1 | 0 | 1 |
| 0 1 1 0 | 0 | 1 | 1 | 0 | 1 | 1 | 0 | 1 | 0 | 1 | 0 | 1 | 1 | 0 | 1 |
| 0 1 1 1 | 0 | 1 | 1 | 0 | 1 | 1 | 0 | 1 | 0 | 1 | 1 | 0 | 1 | 0 | 1 |
| 1 0 0 0 | 1 | 0 | 1 | 0 | 1 | 0 | 1 | 0 | 1 | 1 | 0 | 1 | 1 | 0 | 1 |
| 1 0 0 1 | 1 | 0 | 1 | 0 | 1 | 0 | 1 | 1 | 0 | 1 | 0 | 1 | 1 | 0 | 1 |
| 1 0 1 0 | 1 | 0 | 1 | 0 | 1 | 0 | 1 | 1 | 0 | 1 | 1 | 0 | 1 | 0 | 1 |
| 1 0 1 1 | 1 | 0 | 1 | 0 | 1 | 1 | 0 | 1 | 0 | 1 | 0 | 1 | 1 | 0 | 1 |
| 1 1 0 0 | 1 | 0 | 1 | 0 | 1 | 1 | 0 | 1 | 0 | 1 | 1 | 0 | 1 | 0 | 1 |
| 1 1 0 1 | 1 | 0 | 1 | 1 | 0 | 1 | 0 | 1 | 0 | 1 | 0 | 1 | 1 | 0 | 1 |
| 1 1 1 0 | 1 | 0 | 1 | 1 | 0 | 1 | 0 | 1 | 0 | 1 | 1 | 0 | 1 | 0 | 1 |
| 1 1 1 1 | 1 | 0 | 1 | 1 | 0 | 1 | 0 | 1 | 1 | 0 | 1 | 1 | 0 | 1 | 0 |

METHOD AND APPARATUS FOR ENCODING AND DIRECT OVERWRITING OF MAGNETO-OPTIC DATA

CROSS REFERENCE TO RELATED APPLICATION

This application is a continuation-in-part of application U.S. Ser. No. 06/855,542, filed Apr. 24, 1986, now abandoned, and assigned to the assignee of the present invention.

BACKGROUND OF THE INVENTION

This invention relates to magneto-optic data storage devices, more particularly, to writing new encoded data over old data in devices of that kind. Presently, most magneto-optic data storage devices require one rotation of the disk to erase old data before new data can be written. This arrangement is used because of the difficulty to switch the polarity of the magnetic field rapidly enough to correspond to the new data stream to facilitate directly overwriting old data.

In the prior art, U.S. Pat. No. 3,676,867 teaches an arrangement and interaction of a laser and magnetic-field-producing coil for magnetizing a thin film in an easy direction of magnetization normal to the substrate on which the thin film is deposited. The magnetic field, being weaker than the coercive force of the film, is used for erasing and creating reversed domains in the film at points which are simultaneously heated by a laser beam.

In addition, the prior art includes U.S. Pat. Nos. 4,340,914, 4,495,530 and 3,778,791 in which the magnetic field is controlled or modulated by a signal representing data. U.S. Pat. No. 4,495,530 actually teaches away from using an electromagnet for producing a bipolar magnetic field because of perceived high frequency limitations of such an arrangement. Instead, two other systems configurations for processing information recorded on a magneto-optic medium are described. In one, a pulsed laser is used with a steady-state DC magnetic field. In the other, the magnetic field is driven by the data signal which interacts with a continuous wave laser. Finally, in U.S. Pat. No. 4,472,748 describes a system in which a constant erasing light beam and a modulated recording light beam are focused on adjacent tracks and a reversible external magnetic field is applied to the recording medium. The polarity of the erased tracks alternates every other track. The magnetic field is reversed by switching the direct current supplied to the magnetic-field-generating coil at each revolution of the disk.

Substantial prior art exists which relates to forming circular domains with a laser beam in magnetically coercive materials. See, for example U.S. Pat. Nos. 3,786,452, 3,836,895, 3,787,825 and 3,836,897. However, use of patterns of such domains, including overlapping of successive circular domains to form variable-length elongated domains, for recording encoded data is not shown.

SUMMARY OF THE INVENTION

The present invention provides high linear bit density, substantial immunity to domain size variation and good erasability in a magneto-optic data storage system. In addition, since data may be directly overwritten, overall system speed is enhanced.

According to the present invention, data may be directly overwritten in a magneto-optic medium by locally heating a domain in the active layer of the medium with a short pulse of laser light in the presence of a periodically alternating magnetic field produced by a high frequency resonant coil. By selecting the duration of the laser pulse to be a small fraction of the period of the alternating magnetic field and controlling the timing of the pulse with respect to the phase of the alternating magnetic field, encodable circular and variable-length elongated magnetic domains can be written in the medium. When the locally heated domain cools, that domain in the medium is magnetized in either up or down direction normal to the plane of the substrate in which the medium is deposited as determined by the phase of the alternating magnetic field.

In the present invention, pulse-width modulation (PWM) is used to encode data. Such modulation is produced by controlling the distance between the walls of magneto-optically polarized domains along a track in the medium. Such domains, according to the present invention, may be controllably elongated by overlapping circular domains produced by firing the laser synchronously with the oscillating magnetic field. The overlapped circular domains form continuous domains of variable-length.

DESCRIPTION OF THE DRAWINGS

FIG. 5 is a table showing input data converted into a (2,8) code with an even number of consecutive zeroes.

FIG. 6 is a table showing laser pulsing sequences corresponding to the code in FIG. 5.

FIG. 9A and B are a track diagram showing the immunity to spot-size variation for the system of FIG. 1.

DESCRIPTION OF THE PREFERRED EMBODIMENT

Figure 1:
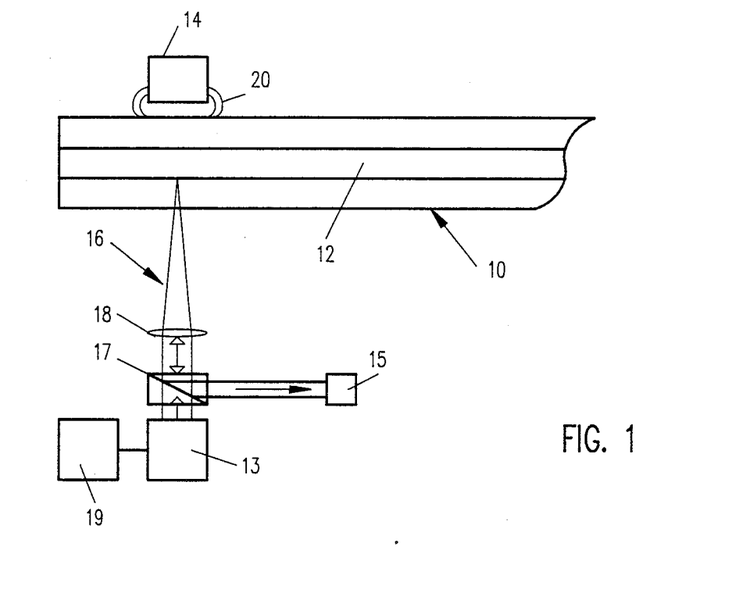
FIG. 1 is a schematic cross-sectional view of a magneto-optic recording system according to the principles of the present invention.

As illustrated in FIG. 1, a magneto-optic recording system embodying the present invention comprises a recording medium 10 having an active layer 12, a source 13 of laser light under the control of a laser driver 19, for producing a pulsed laser light beam 16 focused on active layer 12 by a lens 18, and a source of alternating magnetic field such as coil 14 for producing an alternating magnetic field at megahertz frequencies in the vicinity of the area in active layer 12 at which laser beam 16 is focused. Laser beam 16 is used to locally heat a domain in active layer 12 in the presence of an alternating magnetic field 20 to form a magnetized domain of either up or down direction normal to the plane of medium 10. Detector 15, which includes well-known optics and electronic circuitry for detecting laser light reflected back from layer 12, produces a readback signal therefrom which represents recorded data.

Figure 2:
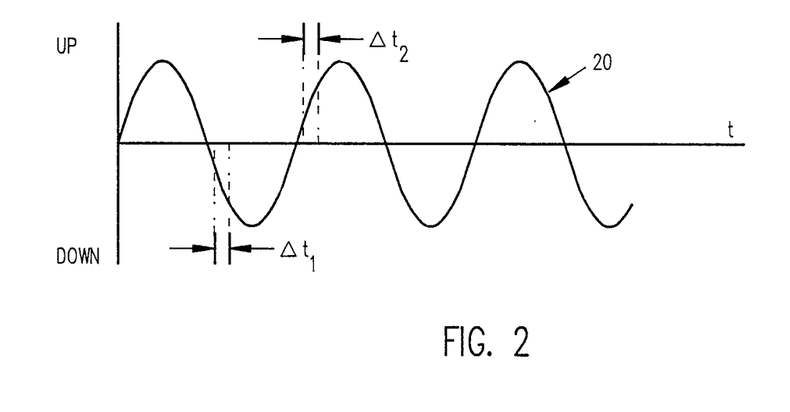
FIG. 2 is a timing diagram showing the timing of laser pulses with respect to the phase of applied magnetic field for the system of FIG. 1.

As shown in FIG. 2, the laser beam is applied to active layer 12 in short pulses the duration of which being a small fraction of the period of alternating magnetic field 20. When the medium cools after the laser pulse terminates, the medium is magnetized in the direction of applied magnetic field at the time the laser pulse was applied. For example, if laser pulse 16 were applied to active layer 12 during time $\Delta t_1$, the polarity of the magnetized domain in the active layer is in the down direction with respect to the plane of active layer 12. Similarly, if laser beam 16 were applied to active layer 12 during time $\Delta t_2$, the magnetization at the domain would be in the up direction with respect to the plane of active layer 12.

Figure 3A:
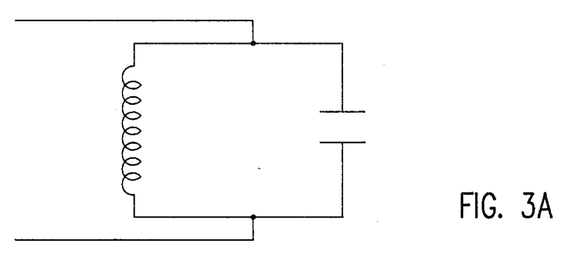
FIGS. 3A, 3B and 3C are schematic diagrams of resonant circuits for producing a magnetic field for the system of FIG. 1.
Figure 3B:
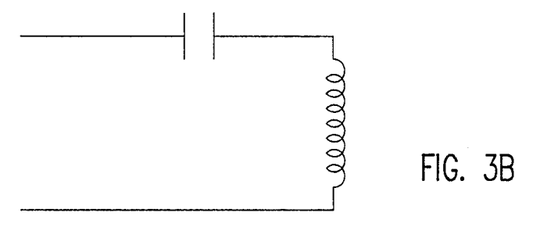
Figure 3C:
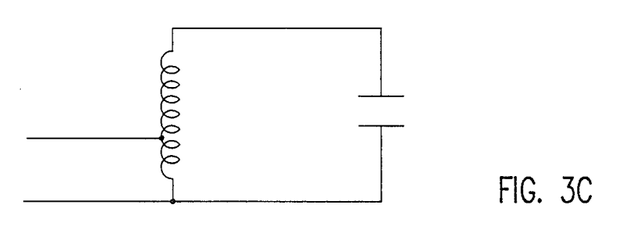

Magnetic field 20 may e produced any number of ways. According to the present invention, however, to achieve megahertz frequencies, a resonant coil circuit is used. Three embodiments of resonant coil circuits are shown in FIGS. 3A-3C. In FIG. 3A, a parallel resonant circuit provides a high input impedance which can be matched to a 50 ohm driver by a step-up transformer. In FIG. 3B, a series resonant circuit, having low input impedance can be matched to driver impedance using a step-down transformer. In FIG. 3C, a parallel resonant circuit with a tapped coil provides impedance matching and required resonant magnetic fields. Component values are determined by the desired operating frequency of magnetic source 14.

Employing the circuit of FIG. 3C, an alternating magnetic field of 200 gauss peak-to-peak can be produced by a coil wound on a rod-like ferrite core. When driven at approximately 25 watts of input power, the circuit, which had a Q of approximately 30 and an input impedance of 50 ohms, resonated at a frequency of 2.3 megahertz. With such a circuit acting as magnetic source 14 disposed approximately one millimeter away from active layer 12, encodable magnetic domains are produced in active layer 12 with 40-nanosecond duration pulses from laser light source 13. Laser light source 13 may be any commonly available laser, such as a gallium arsenide diode laser.

Figure 4:
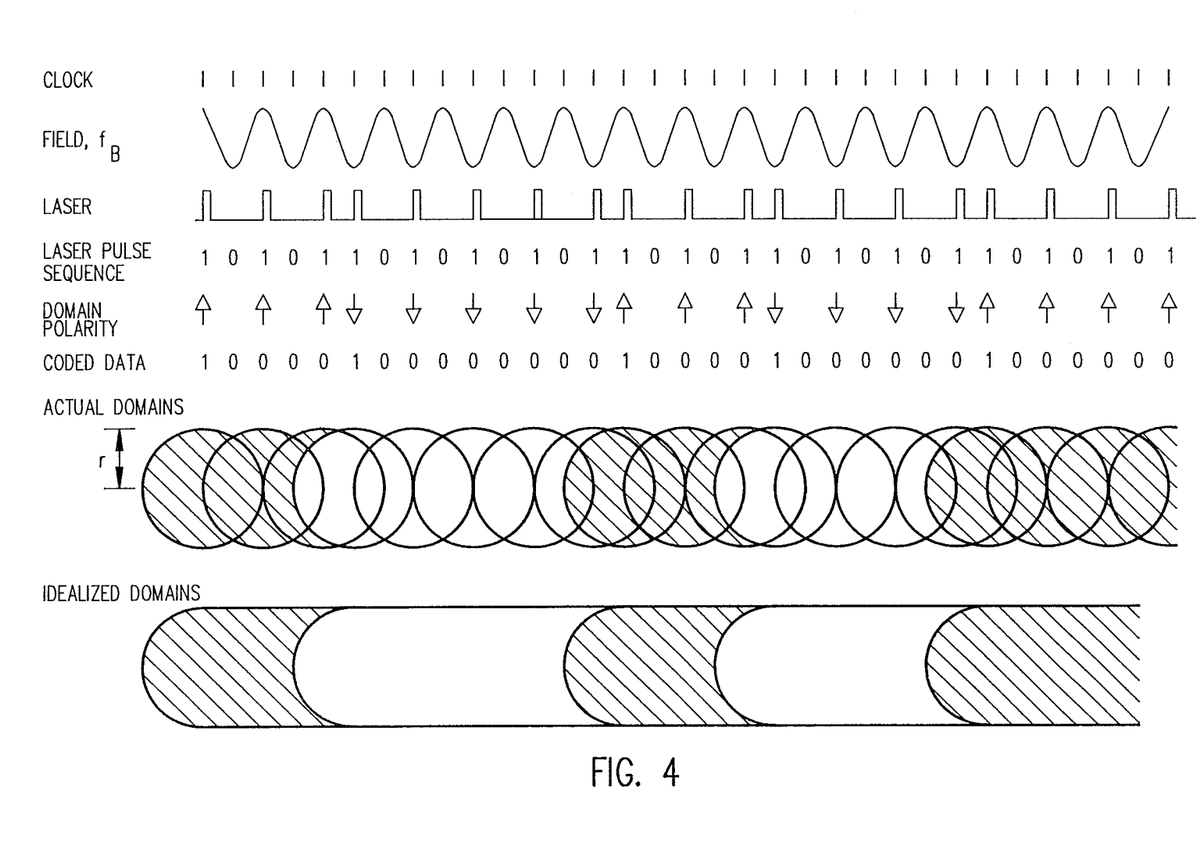
FIG. 4 is a timing diagram showing the formation of encodable variable-length magnetic domains for the system of FIG. 1.

FIG. 4 illustrates a method of encoding data which is compatible with the high frequency magnetic field direct-overwrite system of the present invention. The distance between magnetic domain walls formed in active layer 12 is used to encode the data which is a form of PWM encoding. Continuous elongated domains are formed in active layer 12 by activating laser source 13 several times, once per period during corresponding phases of the alternating magnetic field. Each laser pulse forms a circular domain. For a high enough laser pulse rate and low enough disk velocity, successively formed circular magnetic domains of the same magnetization direction may be disposed in overlapping relationship to form continuous elongated domains of variable-length.

Referring now to FIG. 4, if the frequency of magnetic field 20 is $f_B$ and the radius of a single domain formed in active layer 12 is r, successively formed circular domains will overlap if d is less than 2r, where d is the maximum distance between successive circular domains.

For good erasability and low signal noise, a high percentage of overlap of one domain over another is desirable. Even so, the edges of the resulting elongated domain are not straight, tending to be "scalloped". The fraction of unwritten area, u, compared to an idealized domain with straight edges may be approximated by $$u = \tfrac{1}{2}[1 - \sqrt{1 - d^2/4r^2}]$$

If d=r, then u is 6.0%, which is a measure of overlap imperfection. Imperfect overlap and resulting unwritten area may cause high frequency noise to be present in the detected signal. However, noise can be negligible if the value of 1/d is near the spatial frequency cutoff of the optical detection system or if the domain width is substantially larger than the optical beam size. In addition, the magnetic properties of the medium may act to smooth out the submicron domain width variations leading to further reduction in noise. The overlap imperfection can also be reduced by making d smaller. For example, if d=0.5r, the u is reduced to 1.6%.

The requirement for good domain overlap sets a limitation on disk velocity. If d=r is the desired overlap parameter, then disk velocity is given by $$v = rf_B$$

In converting user data to encoded data, pulse crowding and clock synchronization must be considered. In magnetic recording, these considerations are characterized by the concept of (d,k) parameters in run length limited (RLL) codes. The same parameters are applicable to the magneto-optic direct overwrite recording system of the present invention if further constrained by requiring that the number of consecutive zeroes in (d,k) codes be even.

Referring to FIG. 4, laser source 13 under the control of laser driver 19 may be activated twice during the period of the magnetic field. Thus, the frequency of clock pulses is $2f_B$. Up-oriented domains may be formed by activating a laser on odd clock pulses, and down-oriented domains may be formed on even clock pulses. Therefore, down-to-up transitions may be formed only at odd clock pulses. Similarly, up-to-down transitions may be formed only at even clock pulses. As a result, successive transitions are necessarily separated by an even number of intervening clock pulses.

A change in magnetic orientation at domain walls within a clock period represents a binary 1 while no such change during a clock period represents a zero. Since transitions are necessarily separated by an even number of clock pulses, binary 1's in (d,k) constrained RLL codes applicable to the present invention are separated by an even number of zeroes.

The table in FIG. 5 shows an example of a (2,8) RLL code with rate 4/15 which satisfies the even consecutive zero constraint. The figure shows a table of sixteen 15-bit code words which satisfy the necessary constraints. The sixteen code words are sufficient to encode four bits of input data as shown. Each code word represents a pattern of transitions to be written on the disk.

The writing of the transition patterns given by the code in FIG. 5 requires that laser pulses be fired at the appropriate times in synchronism with the alternating magnetic field. The laser pulsing sequence corresponding to the code in FIG. 5 is given by the table in FIG. 6. A logical 1 indicates that a pulse should be fired during the corresponding clock period. A logical 0 indicates that no laser pulse should be fired. Each bit in the laser pulsing sequence found in FIG. 6, denoted $L_i$, may be derived from the code bits in FIG. 5, denoted $C_i$, using the following boolean expressions:

$L_1 = C_1$ $L_i = C_i + \overline{L_{i-1}}$, for $i \neq 1$

The '+' symbol signifies a logical OR operation and the overbar signifies the logical complement.

Figure 7:
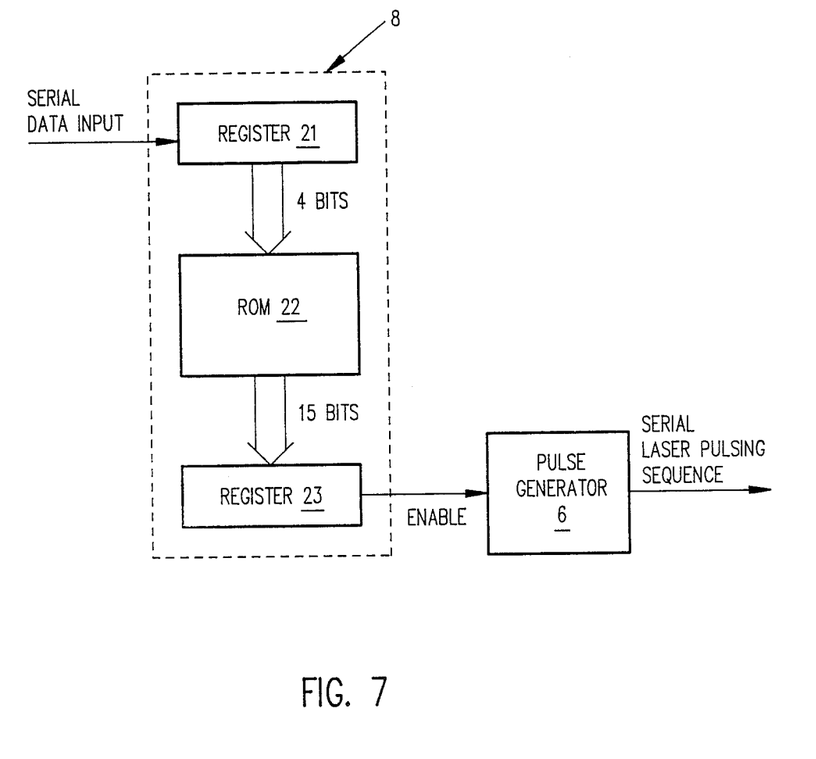
FIG. 7 is a schematic diagram of an encoder to convert the input data into a laser pulsing sequence.

The laser pulsing sequence is generated electronically using the encoder shown in FIG. 7. The serial input data stream is divided into four-bit blocks using register 21. The read only memory (ROM) 22 is used to generate a 15-bit laser firing sequence using the table in FIG. 6. Register 23 is used to convert the 15-bit laser pulsing sequence into a serial binary data stream which is used to control the firing of laser pulses. The ROM 22 could be replaced by a logic array in an alternative implementation.

Figure 8:
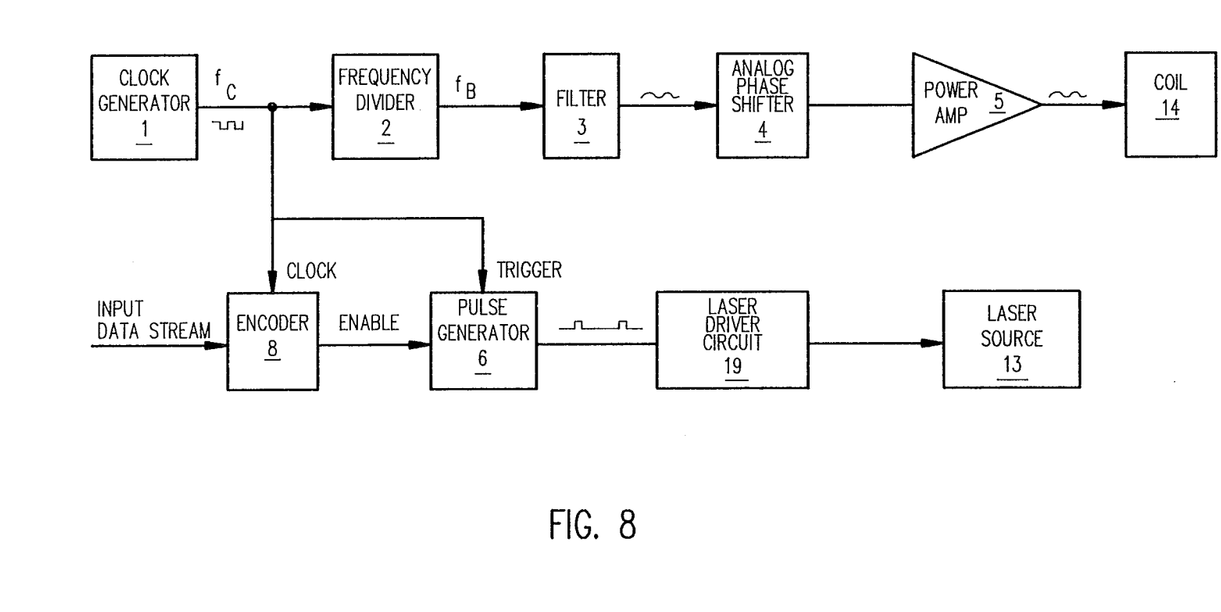
FIG. 8 is a schematic diagram of a circuit illustrating how operation of the laser is synchronized with that of the applied alternating magnetic field.

FIG. 8 illustrates the electronics used to write data onto the recording medium 10, such as an optical recording disk. A clock at frequency $f_C$ is generated by clock generator 1, such as a voltage controlled oscillator. Frequency divider 2, such as a standard J-K flip flop, generates a waveform at frequency $f_B = (\frac{1}{2})f_C$, which is the frequency of the magnetic field. Filter 3 changes the digital waveform into the desired waveform, such as a sine wave. Analog phase shifter 4 (such as described at page 103 in "Applications f Operational Amplifiers - Third Generation Techniques" by J. G. Greene, published by McGraw Hill, 1973), shifts the phase of the output waveform with respect to the phase of clock generator 1. The resulting phase-shifted periodic waveform is amplified by power amplifier 5 which drives the bias coil 14 (FIG. 1).

The clock signal from clock generator 1 is also connected to pulse generator 6, such as a standard one-shot multivibrator. When the enable input is high, the clock signal will trigger pulse generator 6 to generate a short electrical pulse. This pulse is sent to laser driver 19 which turns the laser 13 on for the duration of the pulse. The pulse generator 6 is enabled according to the output state of encoder 8. Encoder 8 serves to convert the input data stream into the desired laser pulsing sequence, as was shown in FIGS. 6 and 7.

The firing of the laser pulses is synchronized with the periodic magnetic field by controlling the phase shift of the analog phase shifter 4. The amount of phase shift generated by shifter 4 is optimally set so that the magnetic field is at an extremum (maximum positive or negative value) when pulse generator 6 fires the laser. This phase shift may be set at the factory.

Figure 9:
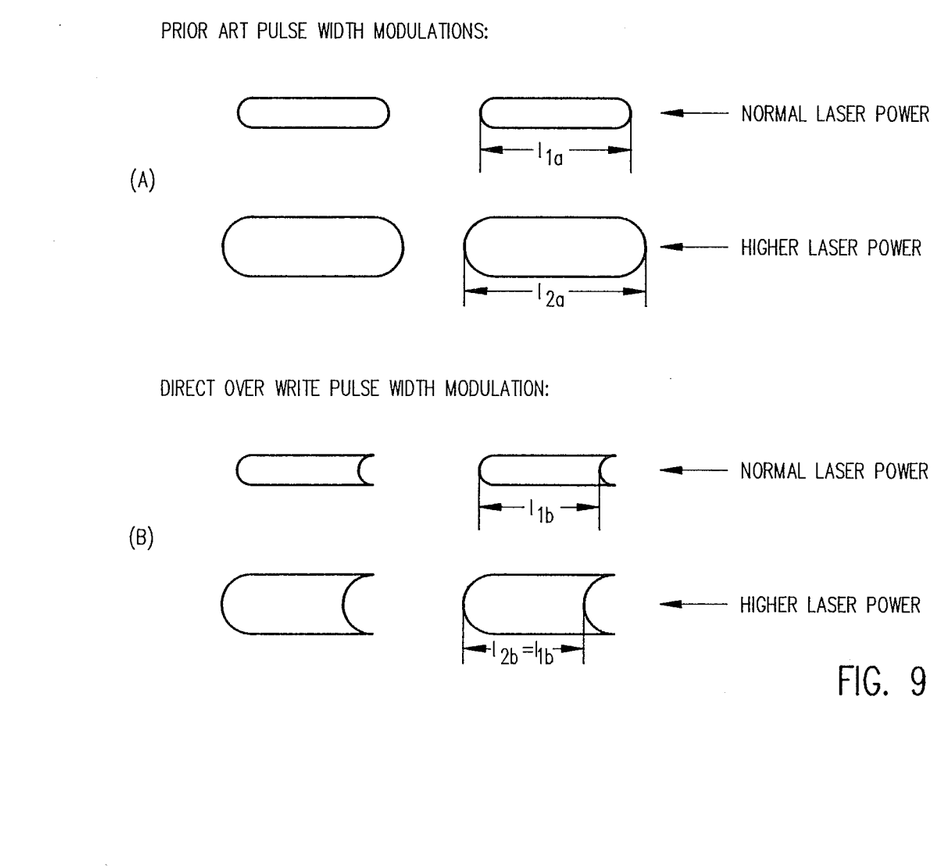

The size of a basic circular domain found in magneto-optic media can vary as a result of many factors including laser power, media sensitivity, ambient temperature, magnetic field strength, focussing error and contamination on the substrate and in the optical subsystem. Referring now to track (A) of FIG. 9, in traditional pulse width modulation encoding, the domains are formed using a single orientation of magnetic field. If the diameter of the basic circular domain increases for some reason, then the length of the encoded domain undesirably elongates along the recording track. If the length change is large enough in a high density storage device, detection errors will arise during data decoding.

In the present invention, the distance between domain transitions along the recording track is substantially unaffected by a change in the diameter of the basic circular domains comprising the elongated domains as shown at track (B) of FIG. 9. If the diameter of the basic circular domains changes, the overlapping relationship of adjacent up- and down-oriented domains formed in active layer 12 according to this invention tends to cancel elongation of such domains along the recording track. See, for example, where 1 represents the length of the domain, that $1_{1a}$ does not equal $1_{2a}$ in track (A) domains, but $1_{1b}$ substantially equals $1_{2b}$ in track (B). Thus, the distance between transitions will be insensitive to variations in the size of the basic circular domains.

While the invention has been shown and described with reference to a preferred embodiment thereof, it will be understood by those skilled in the art that various changes in form and details may be made without departing from the spirit and scope of the invention.

What is claimed is:

1. Apparatus for direct overwriting of encoded data along a track in a magneto-optic recording medium, said apparatus comprising:
   first means for producing a magnetic field having a continually alternating magnetic polarity near the track; and
   second means, coupled to the first means, for selectively heating successively overlapping magnetically polarized domains representing encoded data along the track when the instantaneous polarity of the magnetic field at said domains corresponds to the polarity of the code for the data to be recorded thereat.

2. Apparatus as in claim 1, wherein:
   the magnetic polarity of the magnetic field alternates at frequency $f_B$; and
   the second means is activated at a frequency of approximately $2f_B$.

3. Apparatus as in claim 1, wherein the second means is activated at least once during each period of the alternating magnetic field.

4. Apparatus as in claim 1, wherein the maximum distance between successive domains of radius r is less than 2r.

5. Apparatus as in claim 2, wherein:
   each of said successively overlapping domains are substantially circular; and
   the relative velocity, v, of the track with respect to the first and second means is given approximately by the relation
   $v \leq r f_B$, where r is the radius of one of said overlapping domains.

6. Apparatus as in claim 4, wherein the distance between successive domains is approximately equal to r.

7. Apparatus as in claim 4, wherein the distance between successive domains is approximately equal to 0.5r.

8. Apparatus as in claim 1, wherein:
   the first means includes a resonant coil; and
   the second means includes a selectively controllable source of laser light.

9. Apparatus as in claim 1, wherein said successively overlapping domains form a series of selectively variable-length, substantially continuous, elongated magnetically polarized domains for encoding data in pulse width modulation codes.

10. Apparatus as in claim 1, wherein the encoded data represented by said elongated domains is substantially unaffected by variation in the size of said successively overlapping domains.

11. Apparatus as in claim 1, wherein:
each of said successively overlapping domains are substantially circular; and
the length of said elongated magnetically polarized domains along the track is substantially unaffected by variation in the diameter of each of said successively overlapping substantially circular domains.

12. Apparatus as in claim 9, wherein:
the pulse width modulation code is run length limited; and
the number of consecutive zeroes in said code is even.

13. A method for direct overwriting of encoded data along a track in a magneto-optic recording medium, said method comprising the steps of:
providing a magnetic field having alternating magnetic polarity near the track; and
selectively heating successively overlapping magnetically polarized domains along the track when the instantaneous polarity of the magnetic field at said domains corresponds to the polarity of the code for the data to be recorded thereat for forming a series of selectably variable-length substantially continuous, elongated, magnetically polarized domains representing data encoded on the track in pulse width modulation codes.

14. The method as in claim 13, wherein:
the step of providing magnetic field includes the step of alternating the polarity of the magnetic field at frequency $f_B$; and
the step of selectively heating includes the step of selectively heating domains at a frequency of approximately $2f_B$.

15. The method as in claim 13, wherein the step of selectively heating includes the step of selectively heating domains at least once during each period of the alternating magnetic field.

16. The method as in claim 14, further including the steps of:
successively overlapping substantially circular domains to form said elongated domains; and
moving the track with respect to the magnetic field at a relative velocity, v, given approximately by the relation $v \leq rf_B$, where r is the radius of one of said domains.

17. The method as in claim 16, wherein the step of forming successive domains includes the step of forming successive domains having a distance apart of less than 2r.

18. The method as in claim 16, wherein the step of forming successive domains includes the step of forming successive domains having a distance apart of approximately r.

19. The method as in claim 16, wherein the step of forming successive domains includes the step of forming successive domains having a distance apart of approximately 0.5r.

20. The method as in claim 13, wherein the encoded data represented by said elongated domains is substantially unaffected by variation in the size of said successively overlapping domains.

21. The method as in claim 13, further including the step of:
successively overlapping substantially circular domains to form said elongated domains, the length of which along the track is substantially unaffected by variation in the diameter of each of said successively overlapping, substantially circular domains.

22. The method as in claim 13, herein the data encoded in pulse width modulation code is run length limited and is constrained so that the number of consecutive zeroes in said code is even.

* * * * *